US010437287B2

(12) United States Patent
Park et al.

(10) Patent No.: US 10,437,287 B2
(45) Date of Patent: Oct. 8, 2019

(54) FLEXIBLE DISPLAY DEVICE

(71) Applicant: SAMSUNG DISPLAY CO., LTD., Yongin-si, Gyeonggi-do (KR)

(72) Inventors: Sung-Un Park, Suwon-si (KR); Na-Ri Park, Incheon (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 165 days.

(21) Appl. No.: 15/351,488

(22) Filed: Nov. 15, 2016

(65) Prior Publication Data
US 2017/0192461 A1 Jul. 6, 2017

(30) Foreign Application Priority Data
Dec. 30, 2015 (KR) .......................... 10-2015-0189220

(51) Int. Cl.
G06F 1/16 (2006.01)
(52) U.S. Cl.
CPC .......... G06F 1/1652 (2013.01); G06F 1/1618 (2013.01)

(58) Field of Classification Search
CPC .............................. G06F 1/1652; G06F 1/1618
See application file for complete search history.

(56) References Cited

U.S. PATENT DOCUMENTS

| 2015/0116205 | A1 | 4/2015 | Westerman et al. |
| 2015/0160773 | A1 | 6/2015 | Bernstein et al. |
| 2016/0035812 | A1* | 2/2016 | Kwon ................. H01L 27/3276 257/40 |

FOREIGN PATENT DOCUMENTS

KR  10-2013-0004085 A  1/2013

* cited by examiner

Primary Examiner — Abhishek Sarma
(74) Attorney, Agent, or Firm — Lee & Morse, P.C.

(57) ABSTRACT

A flexible display device includes a flexible substrate body including a first surface and a second surface opposite to the first surface, a display layer on the first surface of the flexible substrate body, a substrate extension portion bent from a side of the flexible substrate body, the substrate extension portion extending along the second surface of the flexible substrate body and overlapping the flexible substrate body, and a sensor layer interposed between the flexible substrate body and the substrate extension portion to detect a movement input to the display layer.

19 Claims, 15 Drawing Sheets

FLEXIBLE DISPLAY DEVICE

CROSS REFERENCE TO RELATED APPLICATION

Korean Patent Application No. 10-2015-0189220, filed on Dec. 30, 2015, in the Korean Intellectual Property Office, and entitled: "Flexible Display Device," is incorporated by reference herein in its entirety.

BACKGROUND

1. Field

Example embodiments relate to a flexible display device. More particularly, example embodiments relate to a flexible display device having a sensor.

2. Description of the Related Art

A flexible display device includes a flexible display panel and a sensor layer. The sensor layer includes a capacitive type sensor for detecting a movement input by user.

Generally, the sensor layer is embedded in the flexible display panel or is disposed on the surface of the flexible display panel. Accordingly, the flexible display device may be relatively thick owing to a complicated structure, and the sensor layer may have a low sensitivity.

SUMMARY

According to some example embodiments, a flexible display device may include a flexible substrate body including a first surface and a second surface opposite to the first surface, a display layer disposed on the first surface of the flexible substrate body, a substrate extension portion bent from a side of the flexible substrate body, the substrate extension portion extending along the second surface of the flexible substrate body and overlapping the flexible substrate body, and a sensor layer interposed between the flexible substrate body and the substrate extension portion to detect a movement input to the display layer.

In example embodiments, the sensor layer may include an elastic layer having an original shape or a changed shape, wherein the original shape is converted into the changed shape by the movement and the original shape is recovered by an elastic force, and first and second electrodes disposed adjacent to the elastic layer. At least a portion of the elastic layer having the changed shape may be inserted between the first and second electrodes spaced apart from each other.

In example embodiments, the first electrode may be disposed under the second surface of the flexible substrate body and receives a first voltage for detecting the movement input to the display layer. The second electrode may be disposed on the substrate extension portion and receives a second voltage. The first voltage may be converted into the second voltage by the portion of the elastic layer having the changed shape.

In example embodiments, the first voltage may correspond to a square wave.

In example embodiments, the flexible display device may further include a first voltage wire disposed under the second surface of the flexible substrate body and electrically connected to the first electrode to apply the first voltage to the first electrode, and a second voltage wire disposed under the second surface of the flexible substrate body and electrically connected to the second electrode disposed on the substrate extension portion through a connection member.

In example embodiments, the connection member may include a silver paste.

In example embodiments, the first electrode may be in contact with the second surface of the flexible substrate body. The second electrode may be in contact with the substrate extension portion.

In example embodiments, the first and second electrodes may be disposed adjacent to the side of the flexible substrate body.

In example embodiments, the first and second electrodes may extend along the side of the flexible substrate body.

In example embodiments, the substrate extension portion may include a bending portion bent from the side of the flexible substrate body, and an extension portion connected to the bending portion and extending along the second side of the flexible substrate body. The first electrode may be disposed under the second surface of the flexible substrate body and one portion of the bending portion. The second electrode may be disposed on the extension portion and another portion of the bending portion.

In example embodiments, the elastic layer may include a resin having nickel.

In example embodiments, the elastic layer may be in contact with the flexible substrate body and the substrate extension portion.

In example embodiments, the elastic layer may extend along the side of the flexible substrate body.

In example embodiments, the sensor layer may further include a first side wall disposed between the elastic layer and the first and second electrodes and being in contact with a first side of the elastic layer, and a second side wall being in contact with a second side of the elastic layer opposite to the first side of the elastic layer. The first side wall may include a hole through which the portion of the elastic layer having the changed shape passes.

In example embodiments, the first and second side walls may include a plastic material.

In example embodiments, the flexible substrate body and the substrate extension portion may include a polyimide.

In example embodiments, the sensor layer may be divided into first and second regions. The elastic layer may be disposed in the first region. The first and second electrodes may be disposed in the second region. The portion of the elastic layer having the changed shape disposed in the first region may be inserted into between the first and second electrodes disposed in the second region.

In example embodiments, the side of the flexible substrate body may include first and third sides opposite to each other, and second and fourth sides that connect the first side to the third side and are opposite to each other. The substrate extension portion may include first through fourth substrate extension portions that are respectively bent from the first through fourth sides and extend along the second side of the flexible substrate body. The sensor layer may include first through fourth sensor layers that are interposed between the flexible substrate body and the first through fourth substrate extension portions, respectively.

In example embodiments, each of the first through fourth sensor layers may include an elastic layer having an original shape or a changed shape, wherein the original shape is converted into the changed shape by the movement and the original shape is recovered by an elastic force, and first and second electrodes disposed adjacent to the elastic layer. At least a portion of the elastic layer having the changed shape is inserted between the first and second electrodes.

In example embodiments, the flexible display device may include a first voltage wire disposed under the second surface of the flexible substrate body and electrically connected to the first electrode of the first sensor layer, first voltage auxiliary wires disposed under the second surface of the flexible substrate body and electrically connecting the first electrodes of the first through fourth sensor layers to each other, and second voltage wires disposed under the second surface of the flexible substrate body and electrically connected to the second electrodes disposed on the first through fourth substrate extension portions through first through fourth connection members, respectively.

In example embodiments, a flexible display device may include a flexible substrate body including a first surface and a second surface opposite to the first surface, a display layer on the first surface of the flexible substrate body, a substrate extension portion to be bent from a side of the flexible substrate body, and a sensor layer having a first portion on the first surface of the flexible substrate body, a second portion on the second surface of the flexible substrate body, and a third portion on the substrate extension portion the sensor layer to detect a movement input to the display layer, wherein, when bent, the substrate extension portion including the third portion of the sensor layer extends along the second surface of the flexible substrate body and overlaps the first and second portions of the sensor layer.

BRIEF DESCRIPTION OF THE DRAWINGS

Features will become apparent to those of ordinary skill in the art by describing in detail exemplary embodiments with reference to the attached drawings in which.

DETAILED DESCRIPTION

Exemplary embodiments will be described more fully hereinafter with reference to the accompanying drawings, in which various embodiments are shown.

Figure 1:
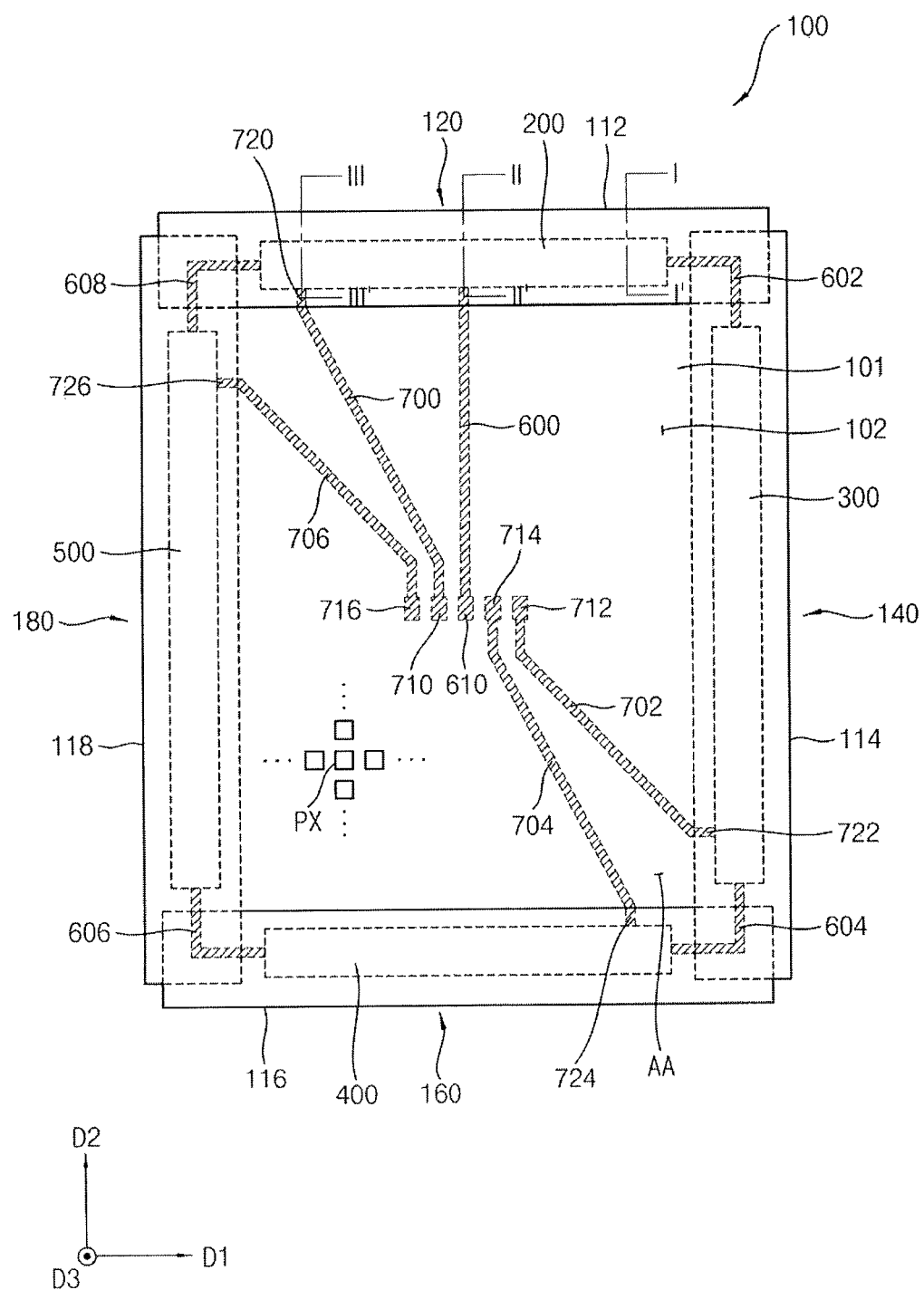
FIG. 1 illustrates a plan view of a flexible display device according to example embodiments.
Figure 2:
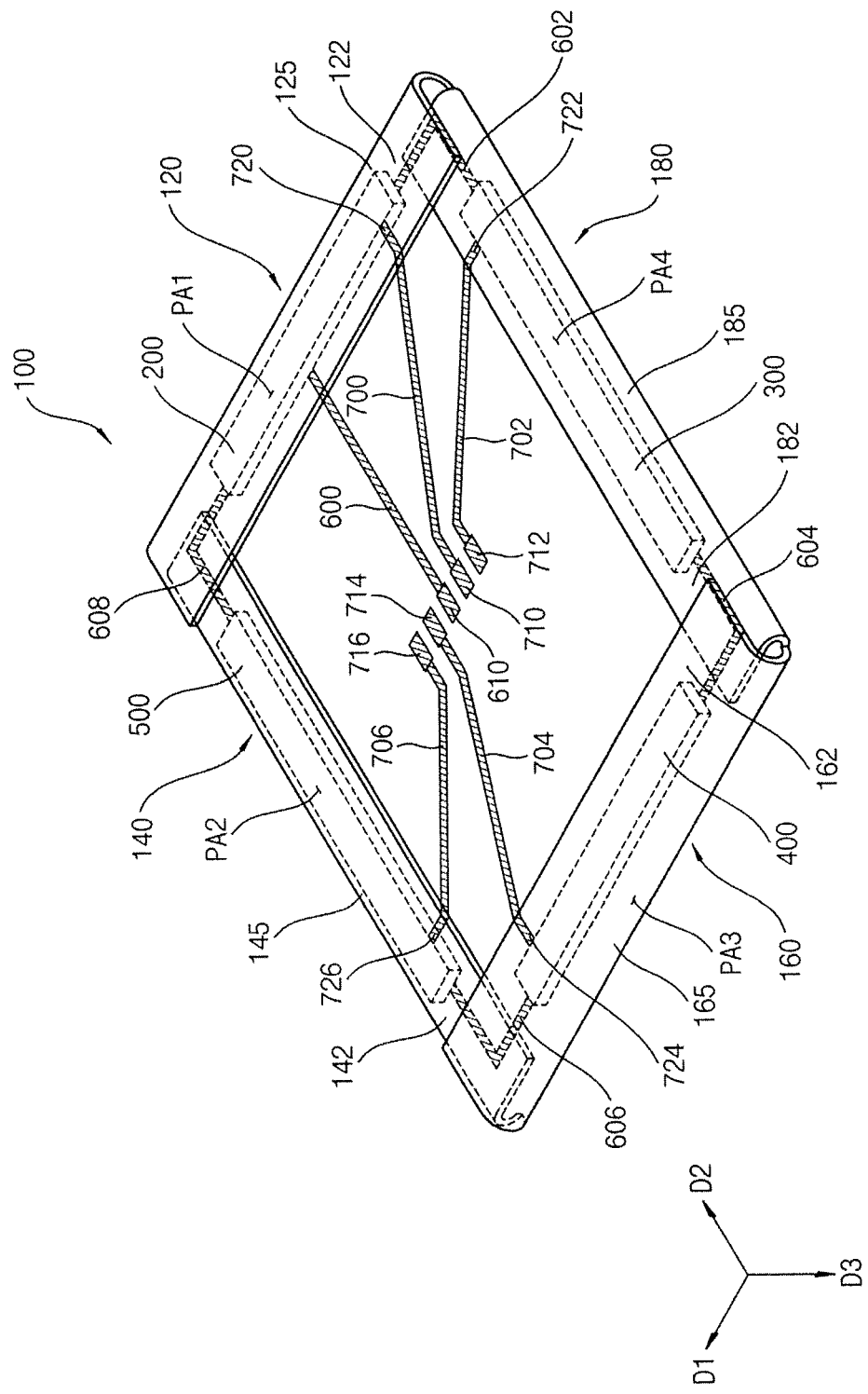
FIG. 2 illustrates a perspective view of a flexible display device of FIG. 1.
Figure 3:
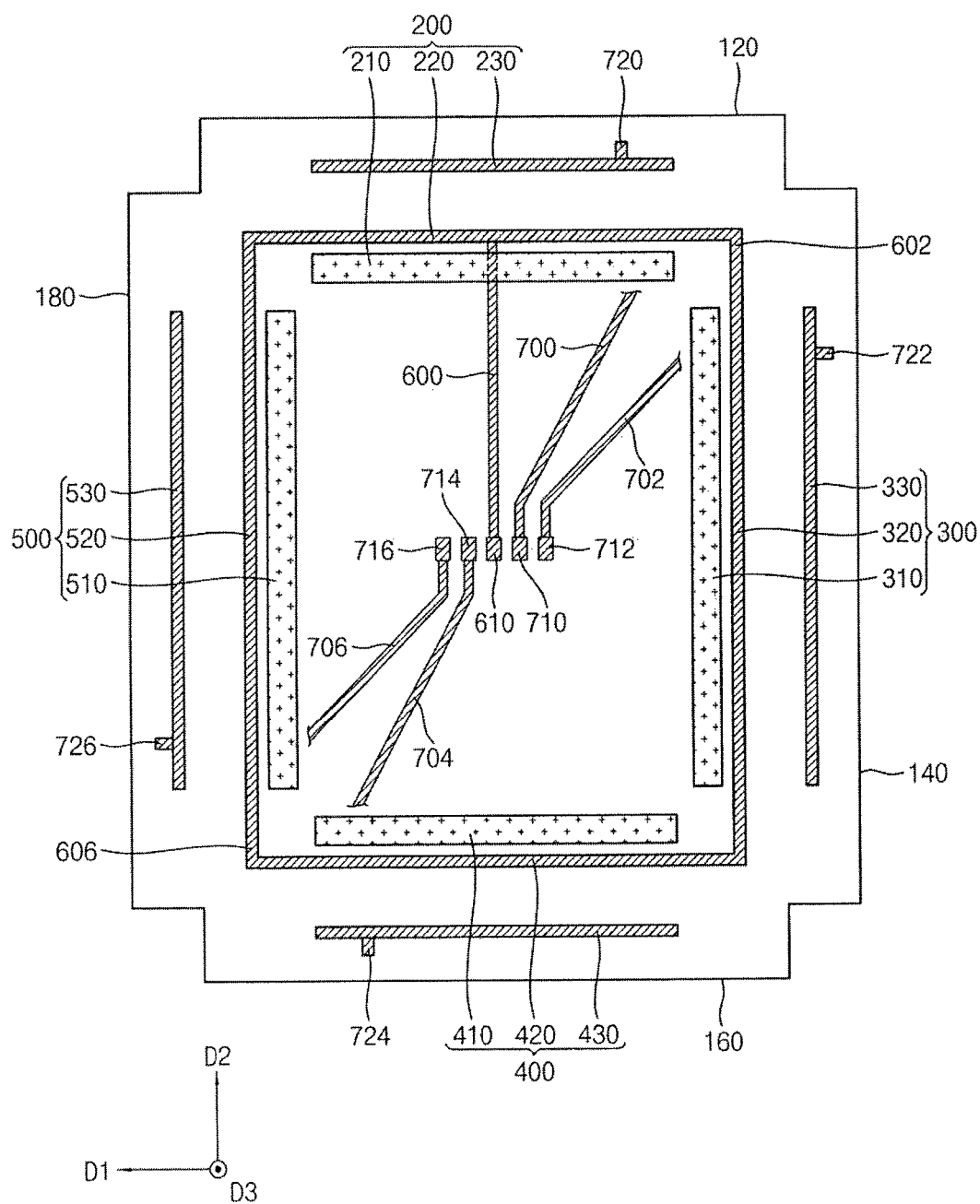
FIG. 3 illustrates a bottom view of a flexible display device of FIG. 1 when substrate extension portions are unfolded.
Figure 4:
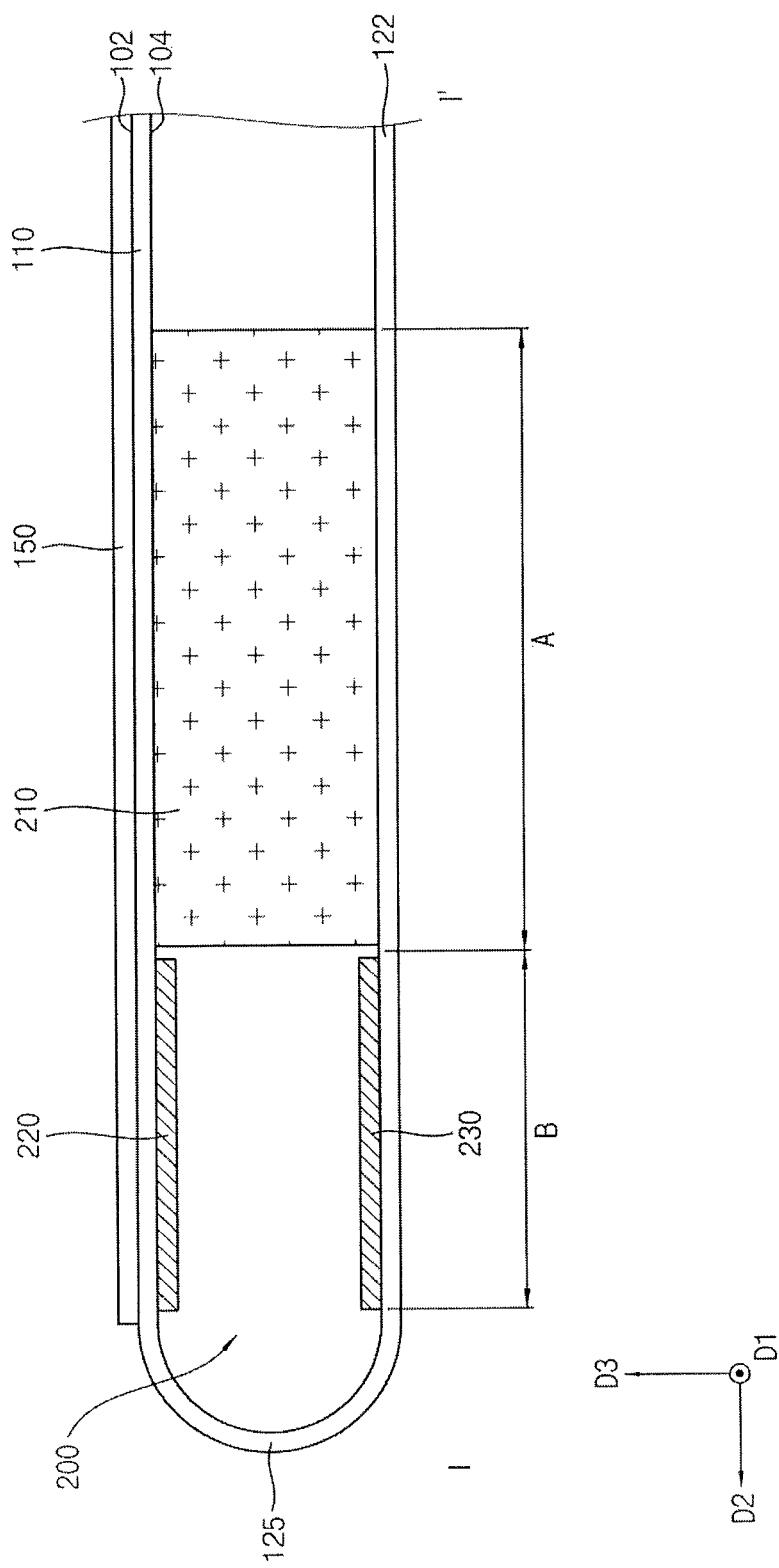
FIG. 4 illustrates a cross-sectional view along the line I-I' of FIG. 1.
Figure 5:
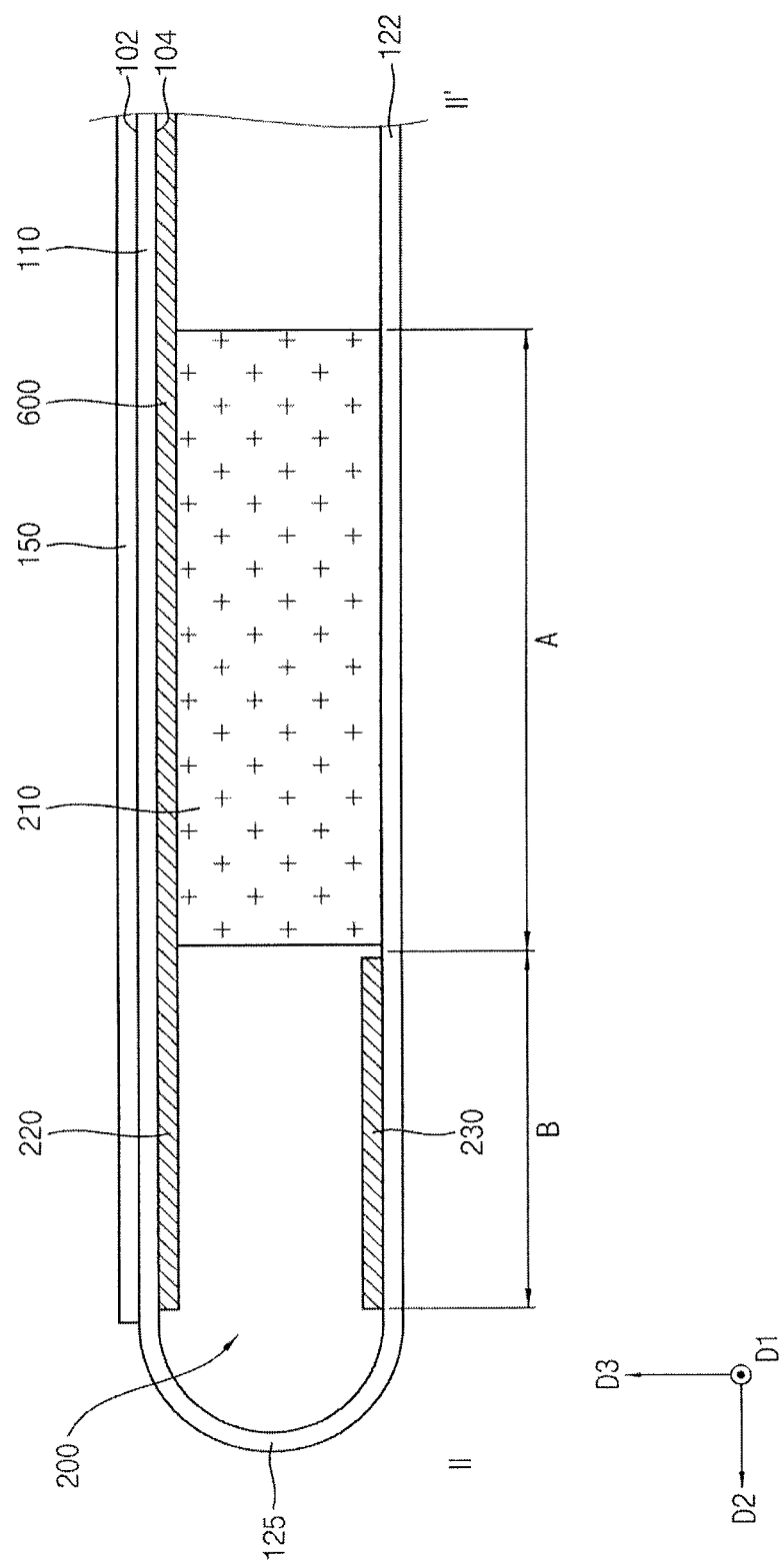
FIG. 5 illustrates a cross-sectional view along the line II-II' of FIG. 1.
Figure 6:
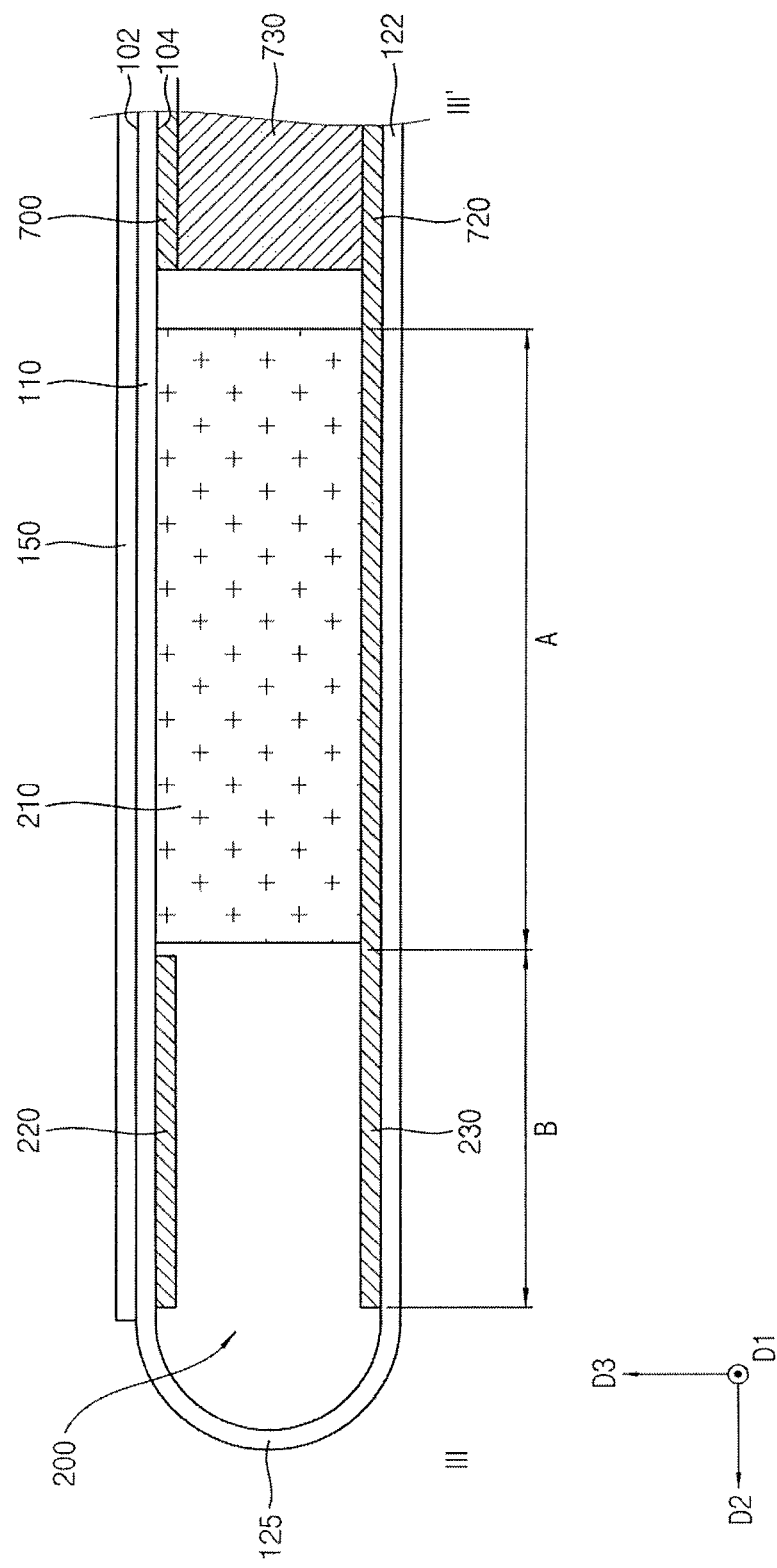
FIG. 6 illustrates a cross-sectional view along the line III-III' of FIG. 1.
Figure 7:
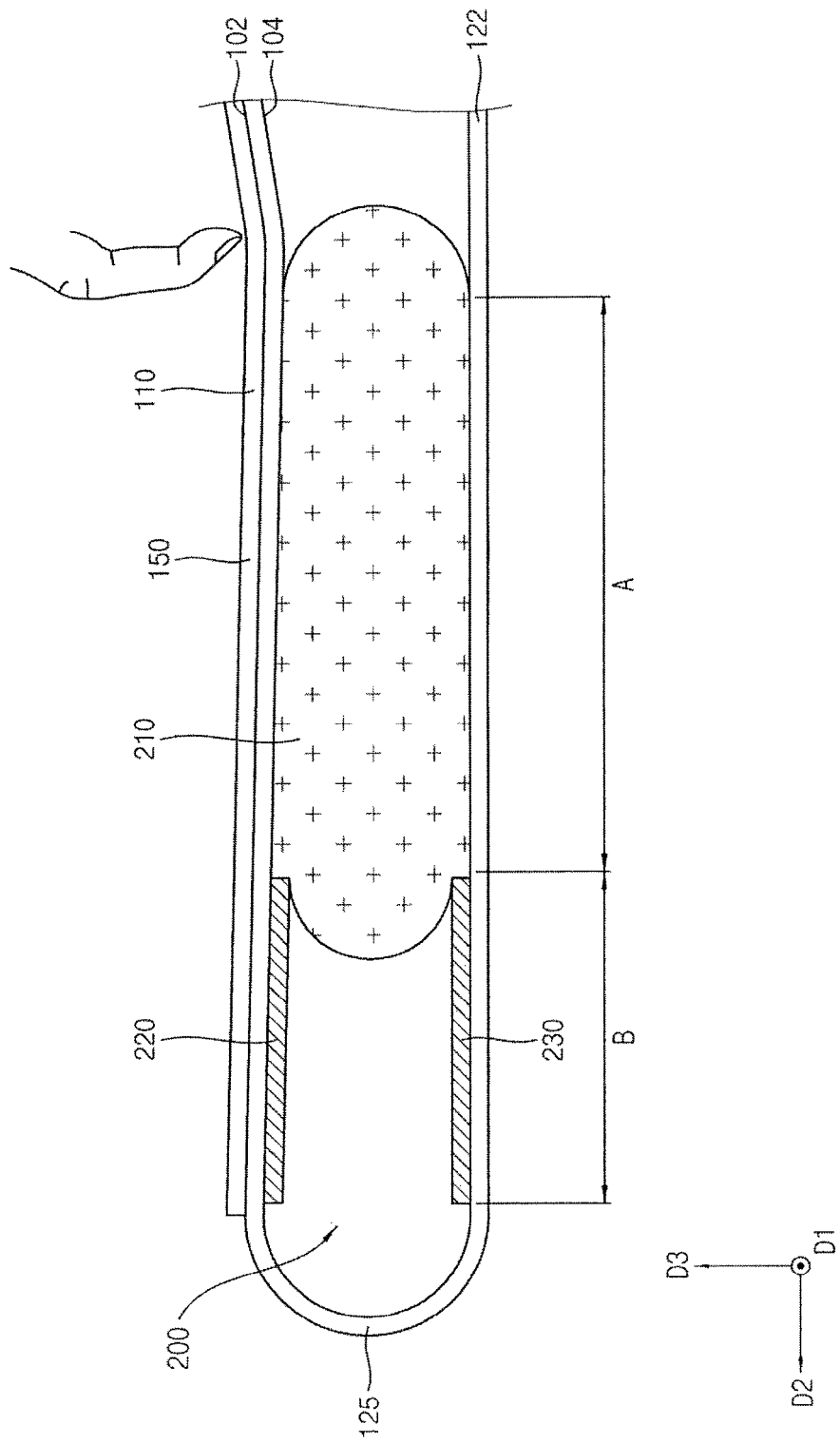
FIG. 7 illustrates a cross-sectional view along the line I-I' of FIG. 1 when a movement is input.

FIG. 1 is a plan view illustrating a flexible display device according to example embodiments. FIG. 2 is a perspective view illustrating a flexible display device of FIG. 1. FIG. 3 is a bottom view illustrating a flexible display device of FIG. 1 when a substrate extension portion is unfolded. FIG. 4 is a cross-sectional view cut along the line I-I' of FIG. 1. FIG. 5 is a cross-sectional view cut along the line II-II' of FIG. 1. FIG. 6 is a cross-sectional view cut along the line of FIG. 1. FIG. 7 is a cross-sectional view cut along the line I-I' of FIG. 1 when a movement is input. As used herein, movement input may include touch, e.g., of a hand or stylus, gestures, and so forth.

Referring to FIGS. 1 through 7, the flexible display device 100 may include a flexible substrate body 110, a display layer 150, first through fourth substrate extension portions 120, 140, 160, 180, and first through fourth sensor layers 200, 300, 400, 500. As may be seen in FIG. 3, the first and third substrate extension portions 120 and 160 may extend from the flexible substrate body 110 in a second direction D2 and second and fourth third substrate extension portions 140 and 180 may extend from the flexible substrate body 110 in a first direction D1, resulting in discontinuities between adjacent regions extending in opposite direction, such that corners are indented to facilitate the bending of the first through fourth substrate extension portions 120, 140, 160, 180 as illustrated in FIGS. 12, and 4-7.

The flexible display device 100 may include an active region AA on which an image is displayed, and first to fourth peripheral regions PA1, PA2, PA3, and PA4 adjacent to the active region AA and not displaying the image. The active region AA may be referred to as a display region.

For example, the active region AA may correspond to the flexible substrate body 110 of the flexible display device 100. The first peripheral region PA1 of the flexible display device 100 may correspond to the first substrate extension portion 120. The second peripheral region PA2 of the flexible display device 100 may correspond to the second substrate extension portion 140. The third peripheral region PA3 of the flexible display device 100 may correspond to the third substrate extension portion 160. The fourth peripheral region PA4 of the flexible display device 100 may correspond to the fourth substrate extension portion 180.

The flexible display device 100 may include a plurality of scan lines, each of which extends in a first direction D1, and a plurality of data lines, each of which extends in a second direction D2 crossing the first direction D1. The flexible display device 100 may include a plurality of pixels PX. The pixels PX may be electrically connected to the scan lines and the data lines. The scan lines, the data lines, and the pixels PX may be disposed in the active region AA of the flexible display device 100.

In addition, the pixels PX may be disposed in a matrix. The scan lines may be electrically connected to a scan driver. The data lines may be electrically connected to a data driver.

The data driver may provide a reference voltage or a pixel data voltage as a data signal to the data lines. For example, the data driver may be mounted on the third substrate extension portion 160.

The scan driver may simultaneously or progressively provide a scan signal to the scan lines. The scan driver may be mounted on the second substrate extension portion 140.

An emission driver may provide an emission signal to the pixels PX. The emission driver may be mounted under the fourth substrate extension portion 180.

The flexible substrate body 110 may include a first surface 102 and a second surface 104 opposite to the first surface 102. The flexible substrate body 110 may include polyimide. Also, the flexible substrate body 110 may include first through fourth sides 112, 114, 116, 118 connecting the first surface 102 and the second surface 104.

The display layer 150 may be disposed on the first surface 102 of the flexible substrate body 110. In one example embodiment, the display layer 150 may include an organic light emitting layer. Alternatively, the display layer 150 may include a liquid crystal layer.

The first substrate extension portion 120 may be bent from the first side 112 of the flexible substrate body 110 and may extend along the second surface 104 of the flexible substrate body 110. The first substrate extension portion 120 may overlap the flexible substrate body 110. For example, the first substrate extension portion 120 may include a bending portion 125 bent from the first side 112 of the flexible substrate body 110 and an extension portion 122 connected to the bending portion 125 and extending along the second side 104 of the flexible substrate body 110.

The second substrate extension portion 140 may be bent from the second side 114 of the flexible substrate body 110 and may extend along the second surface 104 of the flexible substrate body 110. The second substrate extension portion 140 may overlap the flexible substrate body 110. For example, the second substrate extension portion 140 may include a bending portion 145 bent from the second side 114 of the flexible substrate body 110 and an extension portion 142 connected to the bending portion 145 and extending along the second side 104 of the flexible substrate body 110.

The third substrate extension portion 160 may be bent from the third side 116 of the flexible substrate body 110 and may extend along the second surface 104 of the flexible substrate body 110. The third substrate extension portion 160 may overlap the flexible substrate body 110. For example, the third substrate extension portion 160 may include a bending portion 165 bent from the third side 116 of the flexible substrate body 110 and an extension portion 162 connected to the bending portion 165 and extending along the second side 104 of the flexible substrate body 110.

The fourth substrate extension portion 180 may be bent from the fourth side 118 of the flexible substrate body 110 and may extend along the second surface 104 of the flexible substrate body 110. The fourth substrate extension portion 180 may overlap the flexible substrate body 110. For example, the fourth substrate extension portion 180 may include a bending portion 185 bent from the fourth side 118 of the flexible substrate body 110 and an extension portion 182 connected to the bending portion 185 and extending along the second side 104 of the flexible substrate body 110.

In one example embodiment, each of the first through fourth substrate extension portions may include a polyimide.

The first sensor layer 200 may interposed between the flexible substrate body 110 and the first substrate extension portion 120 to detect a movement input to the display layer 150.

The first sensor layer 200 may include an elastic layer 210 and first and second electrodes 220, 230. The elastic layer 210 may have an original shape or a changed shape. Here, the original shape is converted into the changed shape by the movement, and the original shape is recovered by an elastic force. The first and second electrodes 220, 230 may be disposed adjacent to the elastic layer 210. At least a portion of the elastic layer 210 having the changed shape may be inserted between the first and second electrodes 220, 230 spaced apart from each other.

For example, the first sensor layer 200 may be divided into the first and second regions A, B. The elastic layer 210 may be disposed in the first region A. The first and second electrodes 220, 230 may be disposed in the second region B.

Also, at least the portion of the elastic layer 210 disposed in the first region A may be inserted into between the first electrode 220 and the second electrode 230 disposed in the second region B by the movement, e.g., may protrude along the second direction D2 into the space between the first and second electrodes 220, 230.

In one example embodiment, the elastic layer 210 of the first sensor layer 200 may include a resin having nickel (Ni).

In addition, the elastic layer 210 of the first sensor layer 200 may contact the flexible substrate body 110 and the first substrate extension portion 120. The elastic layer 210 may extend along the first side 112 of the flexible substrate body 110.

The first electrode 220 of the first sensor layer 200 may be disposed under the second surface 104 of the flexible substrate body 110. A first voltage for detecting the movement input to the display layer 150 may be applied to the first electrode 220 of the first sensor layer 200.

The second electrode 230 of the first sensor layer 200 may be disposed on the first substrate extension portion 120. A second voltage may be applied to the second electrode 230 of the first sensor layer 200. Here, the first voltage is changed to the second voltage by the portion of the elastic layer 210 having the changed shape.

Accordingly, a capacitance and a resistance between the first electrode 220 and the second electrode 230, the capacitance and the resistance changed by the movement, may be calculated by measuring the second voltage. Accordingly, the movement can be detected.

For example, the first voltage may correspond to a square wave having a high level and a low level which alternate with each other. The second voltage may correspond to a wave to which the first voltage is changed by the portion of the elastic layer 210 having the changed shape.

In one example embodiment, the first electrode 220 may be in contact with the second surface 104 of the flexible substrate body 110. The second electrode 230 may be in contact with the first substrate extension portion 120.

Also, the first and second electrode 220, 230 may be disposed adjacent to the first side 112 of the flexible substrate body 110. The first and second electrode 220, 230 may extend along the first side 112 of the flexible substrate body 110.

The second sensor layer 300 may interposed between the flexible substrate body 110 and the second substrate extension portion 140 to detect the movement input to the display layer 150. The second sensor layer 300 may include an elastic layer 310 and first and second electrodes 320, 330. The elastic layer 310 may have an original shape or a changed shape. The original shape may be converted into the changed shape by the movement input, and the original shape may be recovered by the elastic force. The first and second electrodes 320, 330 may be disposed adjacent to the elastic layer 310. At least a portion of the elastic layer 310 having the changed shape may be inserted between the first and second electrodes 320, 330 spaced apart from each other, e.g., may protrude along the first direction D1 into the space between the first and second electrodes 320, 330.

The third sensor layer 400 may interposed between the flexible substrate body 110 and the third substrate extension portion 160 to detect the movement input to the display layer 150. The third sensor layer 400 may include an elastic layer 410 and first and second electrodes 420, 430. The elastic layer 410 may have an original shape or a changed shape. The original shape is converted into the changed shape by the movement, and the original shape is recovered by the elastic force. The first and second electrodes 420, 430 may be disposed adjacent to the elastic layer 410. At least a portion of the elastic layer 410 having the changed shape may be inserted between the first and second electrodes 420, 430 spaced apart from each other, e.g., may protrude along the second direction D2 into the space between the first and second electrodes 420, 430.

The fourth sensor layer 500 may interposed between the flexible substrate body 110 and the fourth substrate extension portion 180 to detect the movement input to the display layer 150. The fourth sensor layer 500 may include an elastic layer 510 and first and second electrodes 520, 530. The elastic layer 510 may have an original shape or a changed shape. The original shape is converted into the changed shape by the movement, and the original shape is recovered by the elastic force when the movement ceases. The first and second electrodes 520, 530 may be disposed adjacent to the elastic layer 510. At least a portion of the elastic layer 510 having the changed shape may be inserted between the first and second electrodes 520, 530 spaced apart from each other, e.g., may protrude along the first direction D1 into the space between the first and second electrodes 520, 530.

In one example embodiment, each of the elastic layers 310, 410, 510 of the second through fourth sensor layers 300, 400, 500 may include a material substantially the same as a material included in the elastic layer 210 of the first sensor layer 200. In addition, a shape and a structure of each elastic layer 310, 410, 510 of the second through fourth sensor layer 300, 400, 500 may be similar to a shape and a structure of the elastic layer 210 of the first sensor layer 200.

A shape and a structure of the first and second electrodes 320, 330 of the second sensor layer 300, a shape and a structure of the first and second electrodes 420, 430 of the third sensor layer 400, and a shape and a structure of the first and second electrodes 520, 530 of the fourth sensor layer 500 may be substantially the same as a shape and a structure of the first and second electrodes 220, 230 of the first sensor layer 200.

In one example embodiment, the flexible display device 100 may further include a first voltage wire 600 disposed under the second surface 104 of the flexible substrate body 110 and electrically connected to the first electrode 220 of the first sensor layer 200 to apply the first voltage to the first electrode 220.

As shown in FIGS. 1 and 2, the first voltage wire 600 may receive the first voltage via a first voltage pad 610 in the active region AA and may apply the first voltage to the first electrode 220 of the first sensor layer 200. The flexible display device 100 may further include first voltage auxiliary wires 602, 604, 606, 608 disposed under the second surface 104 of the flexible substrate body 110 and electrically connecting the first electrodes 220, 320, 420, 520 of the first through fourth sensor layers 200, 300, 400, 500 to each other. Accordingly, the first voltage may be applied to the first electrodes 320, 420, 520 of the second through fourth sensor layers 300, 400, 500 via the first voltage auxiliary wires 602, 604, 606, 608.

The flexible display device 100 may further include second voltage wires 700, 702, 704, 706 disposed under the second surface 104 of the flexible substrate body 110 and electrically connected to the second electrodes 230, 330, 430, 530 of the first through fourth sensor layers 200, 300, 400, 500.

As shown in FIG. 6, the second voltage applied to the second electrode 230 of the first sensor layer 200 may be applied to the second voltage pad 710 through a second voltage auxiliary pad 720, a first connection member 730, and a second voltage wire 700.

In one example embodiment, the first connection member 730 may include a silver paste. Alternatively, the first connection member 730 may include a liquid metal or a conductive polymer material. The first connection member 730 may include a protrusion portion and a reception portion coupled to the protrusion portion.

Similarly, the second voltage applied to the second electrode 330 of the second sensor layer 300 may be applied to the second voltage pad 712 through a second voltage auxiliary pad 722, a second connection member, and a second voltage wire 702. The second voltage applied to the second electrode 430 of the third sensor layer 400 may be applied to the second voltage pad 714 through a second voltage auxiliary pad 724, a third connection member, and a second voltage wire 704. The second voltage applied to the second electrode 530 of the fourth sensor layer 500 may be applied to the second voltage pad 716 through a second voltage auxiliary pad 726, a fourth connection member, and a second voltage wire 706.

Accordingly, a capacitance and a resistance between the first and second electrodes 220, 230 of the first sensor layer 200, a capacitance and a resistance between the first and second electrodes 320, 330 of the second sensor layer 300, a capacitance and a resistance between the first and second electrodes 420, 430 of the third sensor layer 400, and a capacitance and a resistance between the first and second electrodes 520, 530 of the fourth sensor layer 500, the capacitances and the resistances changed by the movement, may be calculated by measuring the second voltages, respectively. Therefore, the movement can be detected more accurately.

As shown in FIG. 7, when the pressure (or the movement) is input to the display layer 150, e.g., by a user's finger, at least a portion of the elastic layer 210 disposed in the first region A of the first sensor layer 200 may be inserted in, e.g., protrude into, the second region B of the first sensor layer 200. Accordingly, the capacitance and insulation resistance of the first and second electrode 220, 230 may be changed. Therefore, the movement can be detected by measuring the capacitance and insulation resistance.

In the flexible display device 100 according to an exemplary embodiment, the first through fourth sensor layers 200, 300, 400, 500 may be disposed in a space between the flexible substrate body 110 and one of the first through fourth substrate extension portions 120, 140, 160, 180 that bend and extend from the flexible substrate body 110. Accordingly, the display device may be implemented as a simple structure with a decreased thickness.

In addition, each of the first through fourth sensor layers 200, 300, 400, 500 can measure a change in the capacitance and resistance between the first and second electrodes by the elastic layers 210, 310, 410, 510, thereby improving the sensitivity of the sensor layer.

Figure 8:
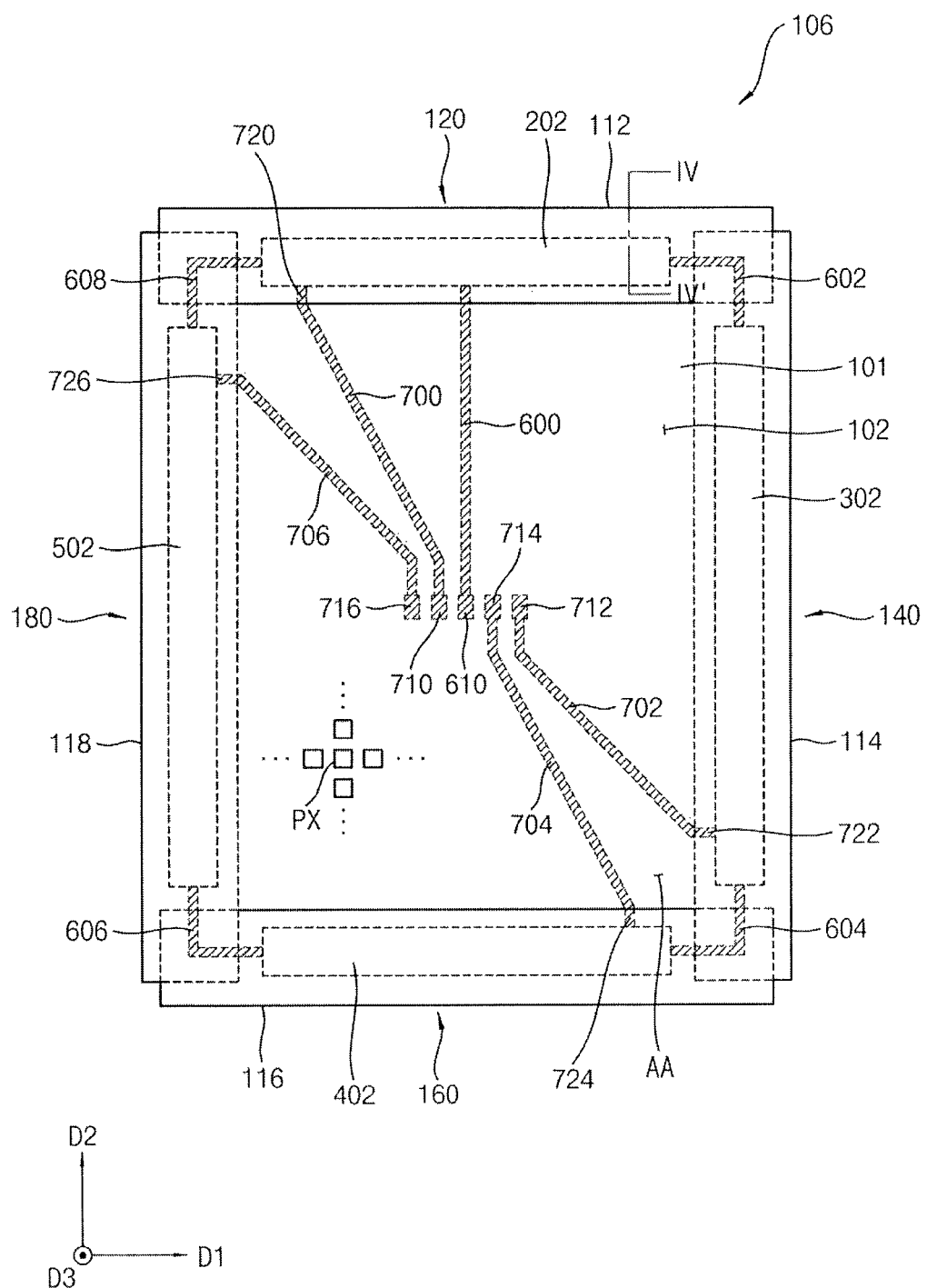
FIG. 8 illustrates a plan view of a flexible display device according to example embodiments.
Figure 9:
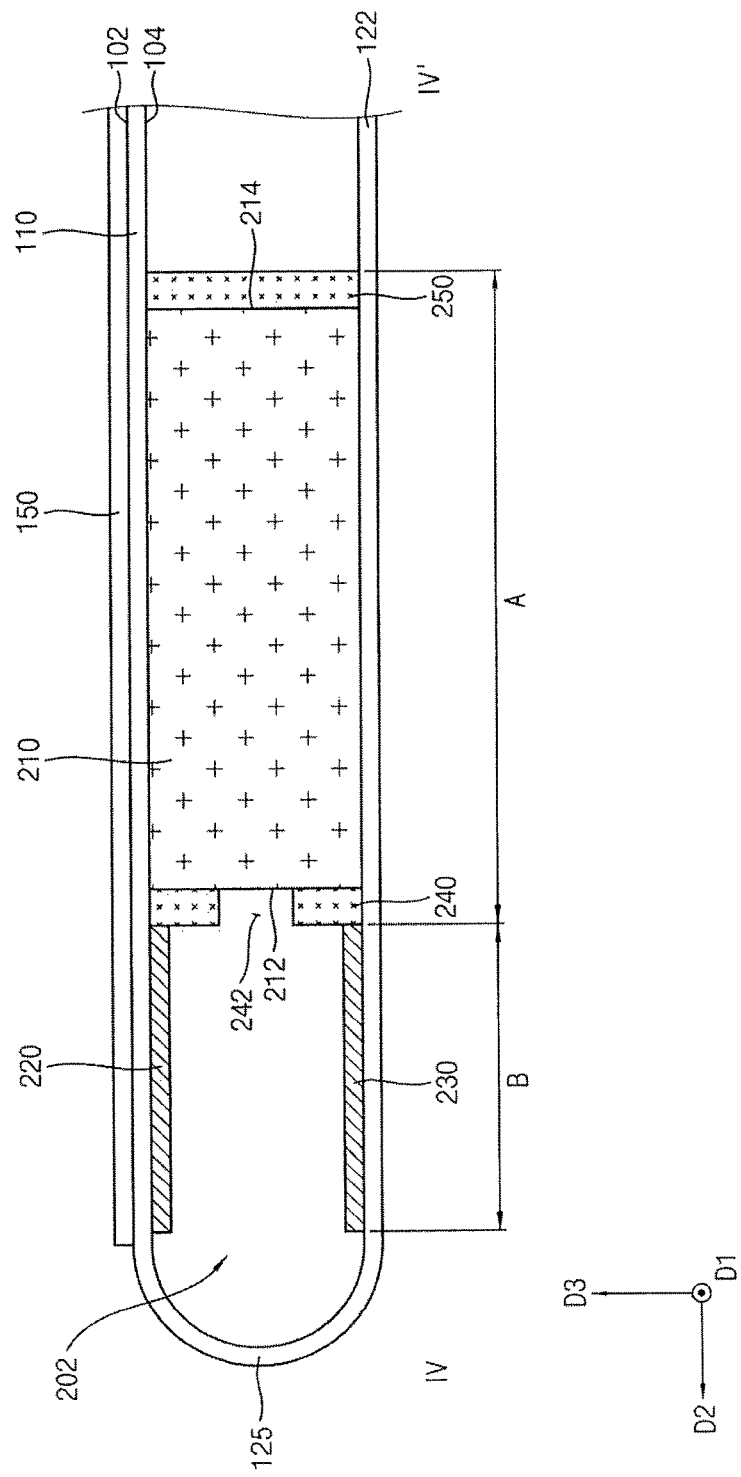
FIG. 9 illustrates a cross-sectional view along the line IV-IV' of FIG. 8.
Figure 10:
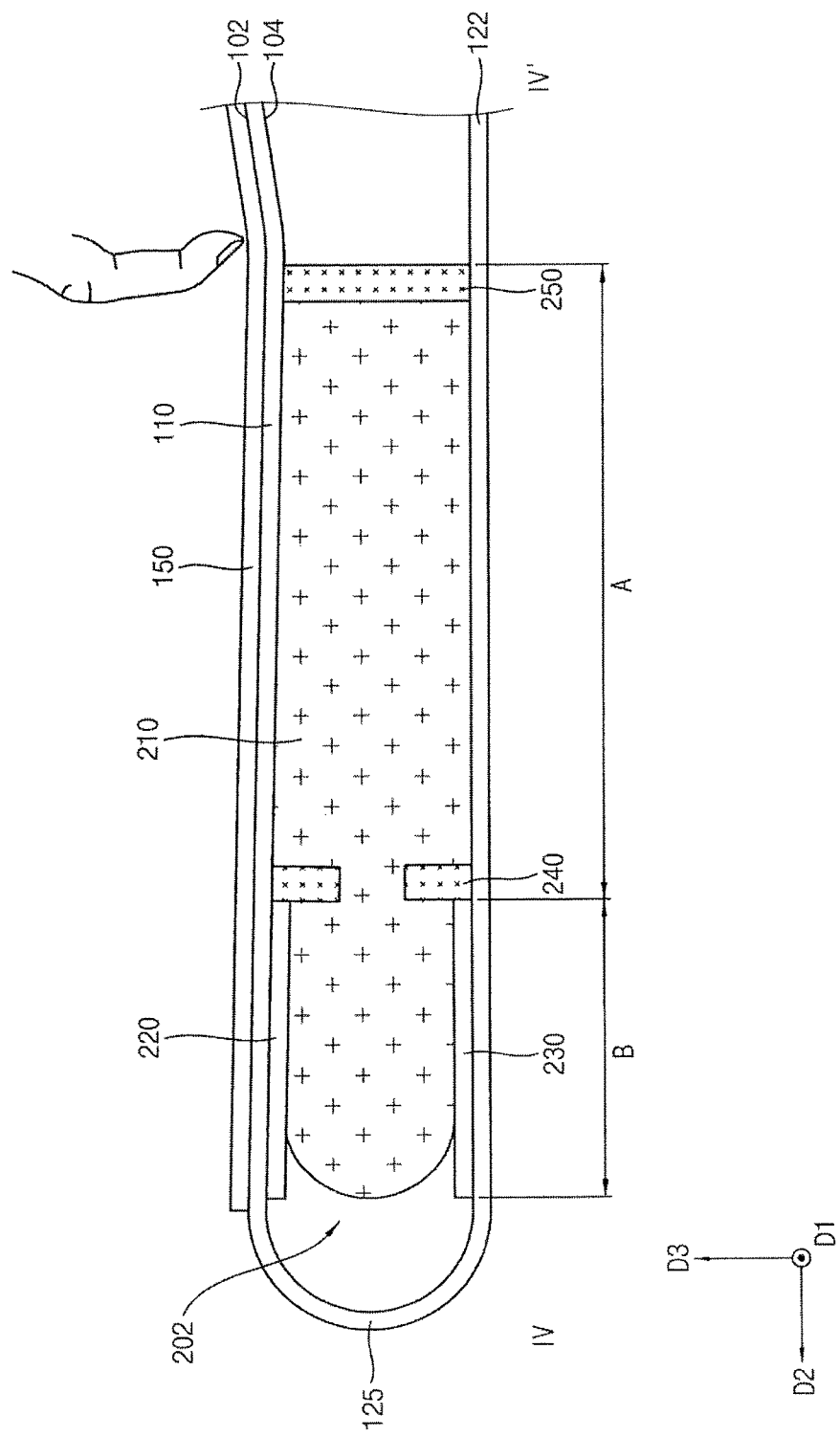
FIG. 10 illustrates a cross-sectional view along the line IV-IV' of FIG. 8 when a movement is input.

FIG. 8 is a plan view illustrating a flexible display device 106 according to example embodiments. FIG. 9 is a cross-sectional view along the line IV-IV' of FIG. 8. FIG. 10 is a cross-sectional view along the line IV-IV' of FIG. 8 when a movement is input. The display device according to the present exemplary embodiment is substantially the same as the display device of the exemplary embodiment described in FIGS. 1 through 7, except that first and second walls are added. Therefore, the same reference numerals will be used to refer to the same or like parts as those described in the previous exemplary embodiment of FIGS. 1 through 7, and any repetitive explanation concerning the above elements will be omitted.

The display device 106 may include the flexible substrate body 110, the display layer 150, first through fourth substrate extension portions 120, 140, 160, 180, and first through fourth sensor layers 202, 302, 402, 502.

The first sensor layer 202 may interposed between the flexible substrate body 110 and the first substrate extension portion 120 to detect a movement input to the display layer 150. The first sensor layer 202 may include an elastic layer 210 and first and second electrodes 220, 230. The elastic layer 210 may have an original shape or a changed shape. Here, the original shape is converted into the changed shape by the movement, and the original shape is recovered by an elastic force when the movement ceases. The first and second electrodes 220, 230 may be disposed adjacent to the elastic layer 210. At least a portion of the elastic layer 210 having the changed shape may be inserted between the first and second electrodes 220, 230 spaced apart from each other.

For example, the first sensor layer 202 may be divided into the first and second regions A, B. The elastic layer 210 may be disposed in the first region A. The first and second electrodes 220, 230 may be disposed in the second region B. Also, at least the portion of the elastic layer 210 disposed in the first region A may be inserted into between the first electrode 220 and the second electrode 230 disposed in the second region B by the movement.

Specifically, the first sensor layer 202 may further include a first side wall 240 and a second side wall 250, e.g., extending along the third direction D3 between the second surface 104 and the extension portion 122. The first side wall 240 may be disposed between the elastic layer 210 and the first and second electrodes 220, 230 and may be in contact with a first side 212 of the elastic layer 210. The second side wall 250 may be in contact with a second side 214 of the elastic layer 210 opposite to the first side 212 of the elastic layer 210, e.g., separated along the second direction D1.

The first side wall 240 may include a hole 242 through which at least the portion of the elastic layer 210 having the changed shapes is to pass in response to movement input. Accordingly, at least the portion of the elastic layer 210 disposed in the first region A may be inserted in the second region B through the hole 242 of the first side wall 240 when the movement is input.

In one example embodiment, the first and second side walls 240, 250 may include a plastic material.

The first electrode 220 of the first sensor layer 202 may be disposed under the second surface 104 of the flexible substrate body 110. A first voltage for detecting the movement input to the display layer 150 may be applied to the first electrode 220 of the first sensor layer 202.

The second electrode 230 of the first sensor layer 202 may be disposed on the first substrate extension portion 120. A second voltage may be applied to the second electrode 230 of the first sensor layer 202. Here, the first voltage is converted into the second voltage by at least the portion of the elastic layer 210 having the changed shape.

Accordingly, a capacitance and a resistance between the first electrode 220 and the second electrode 230, the capacitance and the resistance changed by the movement, may be calculated by measuring the second voltage, thereby detecting the movement.

Similarly, the second through fourth sensor layers 302, 402, 502 may further include the first and second walls.

As shown in FIGS. 9 and 10, when the pressure is input to the display layer 150, e.g., by a user's finger, at least a portion of the elastic layer 210 disposed in the first region A of the first sensor layer 202 may be inserted in the second region B of the first sensor layer 202 through the hole 242 of the first side wall 240. As a result, the capacitance and insulation resistance of the first and second electrode 220, 230 may be changed, and the movement of user's finger can be detected by measuring the capacitance and insulation resistance.

Specifically, when the first side wall 240 and the second side wall 250 are included, the elastic layer 210 may be deformed more largely, e.g., due to restrictions on the elastic layer 210. Accordingly, the sensitivity of the first through fourth sensor layers 202, 302, 402, 502 can be improved.

For example, at least the portion of the elastic layer 210 may be inserted in a space between the first and second electrodes 220, 230 such that the space is sufficiently filled with the portion of the elastic layer 210 by the movement. Therefore, the capacitance and insulation resistance between the first and second electrode 220, 230 can be changed more largely, thereby improving the sensitivity of the sensor layers 202, 302, 402, 502.

Figure 11:
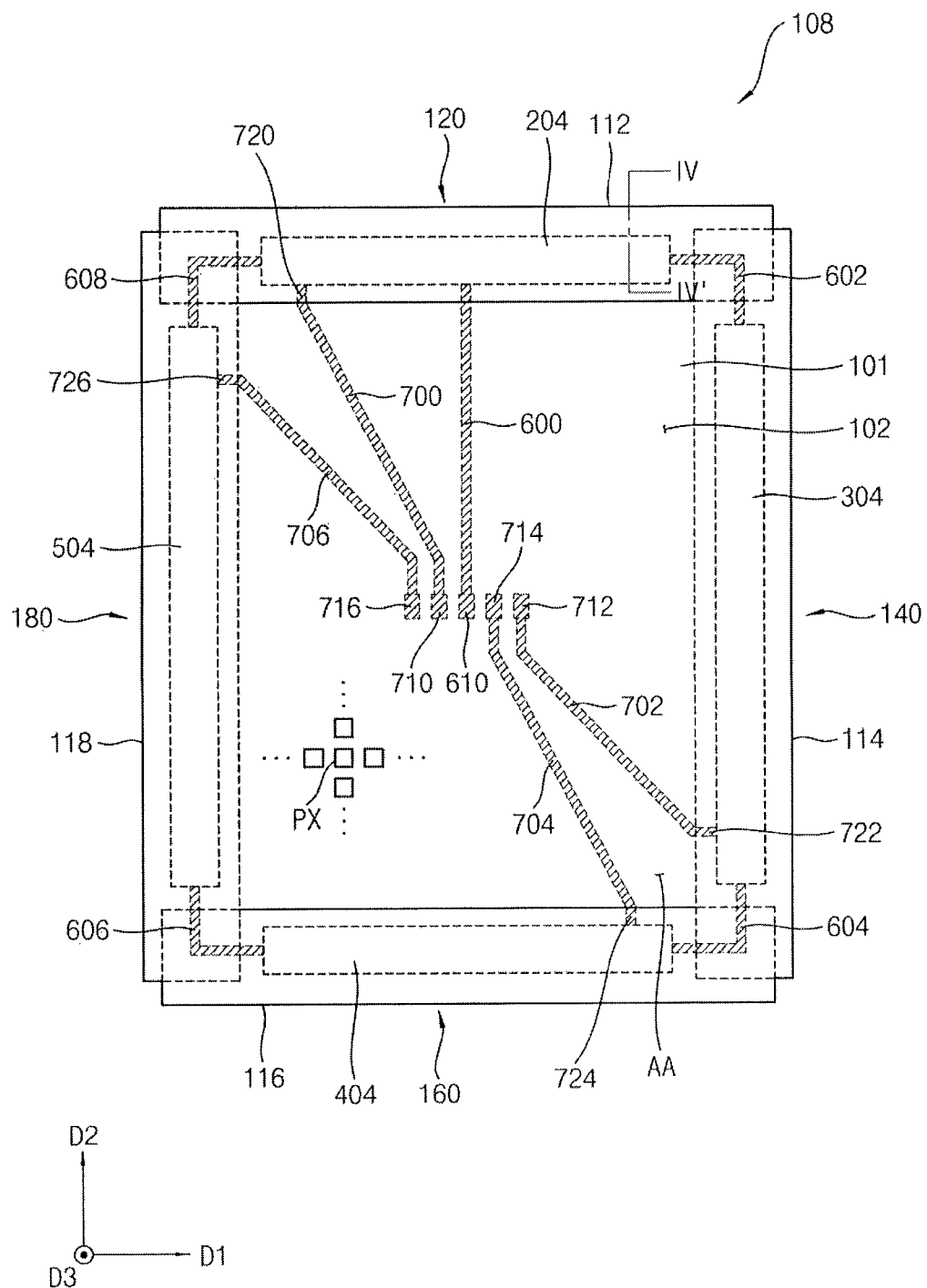
FIG. 11 illustrates a plan view of a flexible display device according to example embodiments.
Figure 12:
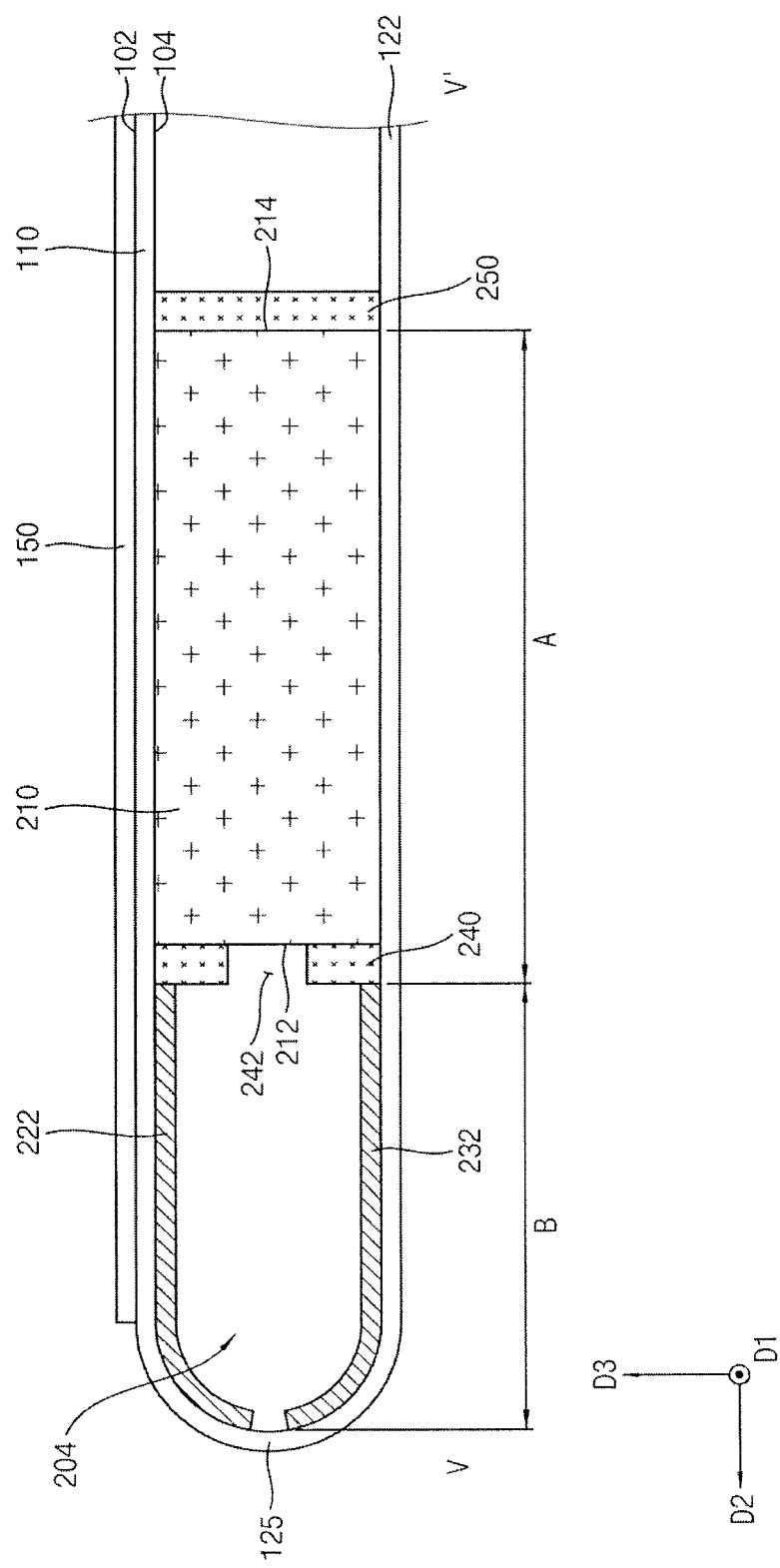
FIG. 12 illustrates a cross-sectional view along the line V-V' of FIG. 11.
Figure 13:
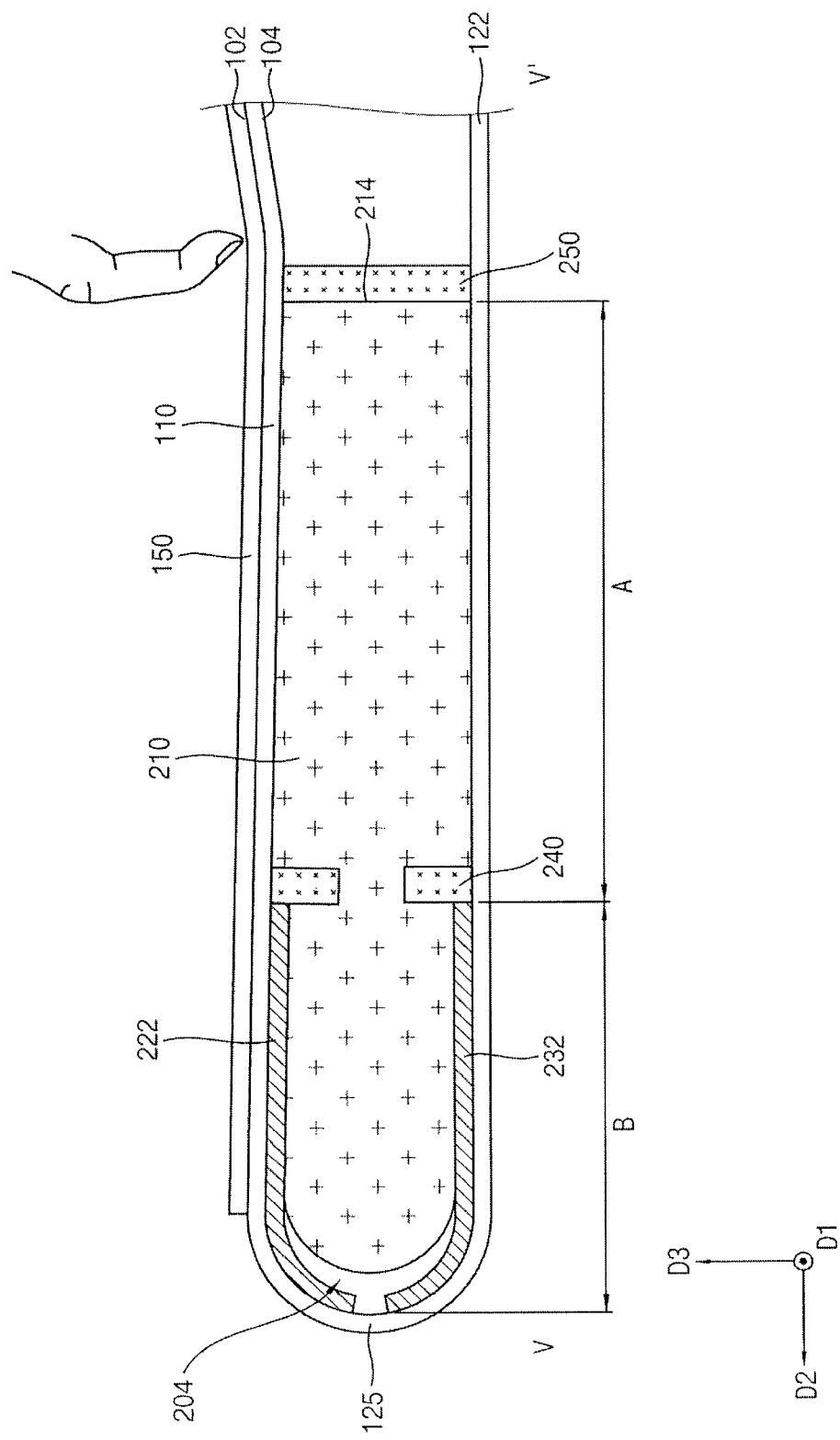
FIG. 13 illustrates a cross-sectional view along the line V-V' of FIG. 11 when a movement is input.

FIG. 11 is a plan view illustrating a flexible display device 105B according to example embodiments. FIG. 12 is a cross-sectional view along the line V-V' of FIG. 11. FIG. 13 is a cross-sectional view along the line V-V' of FIG. 11 when a movement is input. The display device according to the present exemplary embodiment is substantially the same as the display device of the exemplary embodiment described in FIGS. 8 through 10, except that first and second electrodes are further disposed on the bending portion. Therefore, the same reference numerals will be used to refer to the same or like parts as those described in the previous exemplary embodiment of FIGS. 8 through 10, and any repetitive explanation concerning the above elements will be omitted.

Referring to FIGS. 11 through 13, the flexible display device 108 may include the flexible substrate body 110, the display layer 150, first through fourth substrate extension portions 120, 140, 160, 180, and first through fourth sensor layers 204, 304, 404, 504.

The first substrate extension portion 120 may include a bending portion 125 bent from the first side 112 of the flexible substrate body 110 and an extension portion 122 connected to the bending portion 125 and extending along the second side 104 of the flexible substrate body 110.

The second substrate extension portion 140 may include a bending portion 145 bent from the second side 114 of the flexible substrate body 110 and an extension portion 142 connected to the bending portion 145 and extending along the second side 104 of the flexible substrate body 110.

The third substrate extension portion 160 may include a bending portion 165 bent from the third side 116 of the flexible substrate body 110 and an extension portion 162 connected to the bending portion 165 and extending along the second side 104 of the flexible substrate body 110.

The fourth substrate extension portion 180 may include a bending portion 185 bent from the fourth side 118 of the flexible substrate body 110 and an extension portion 182 connected to the bending portion 185 and extending along the second side 104 of the flexible substrate body 110.

The first sensor layer 204 may be interposed between the flexible substrate body 110 and the first substrate extension portion 120 to detect a movement input to the display layer 150.

The first sensor layer 204 may include an elastic layer 210 and first and second electrodes 222, 232. The elastic layer 210 may have an original shape or a changed shape. Here, the original shape is converted into the changed shape in response to the movement input, and the original shape is recovered by an elastic force when the movement input ceases. The first and second electrodes 222, 232 may be disposed adjacent to the elastic layer 210. At least a portion of the elastic layer 210 having the changed shape may be inserted between the first and second electrodes 222, 232 spaced apart from each other.

For example, the first sensor layer 204 may be divided into the first and second regions A, B. The elastic layer 210 may be disposed in the first region A. The first and second electrodes 222, 232 may be disposed in the second region B. Also, at least the portion of the elastic layer 210 disposed in the first region A may be inserted between the first electrode 222 and the second electrode 232 disposed in the second region B by the movement.

Specifically, the first sensor layer 204 may further include a first side wall 240 and a second side wall 250. The first side wall 240 may be disposed between the elastic layer 210 and the first and second electrodes 222, 232 and may be in contact with a first side 212 of the elastic layer 210. The second side wall 250 may be in contact with a second side 214 of the elastic layer 210 opposite to the first side 212 of the elastic layer 210.

The first side wall 240 may include a hole 242 through which at least the portion of the elastic layer 210 having the changed shape passes. Accordingly, at least the portion of the elastic layer 210 disposed in the first region A may be inserted in the second region B through the hole 242 of the first side wall 240 when the movement is input.

In one example embodiment, the first and second side walls 240, 250 may include a plastic material.

The first electrode 222 of the first sensor layer 204 may be disposed under the second surface 104 of the flexible substrate body 110. A first voltage for detecting the movement input to the display layer 150 may be applied to the first electrode 222 of the first sensor layer 204.

In one example embodiment, the first electrode 222 of the first sensor layer 204 may be disposed under the second surface 104 of the flexible substrate body 110 and one portion of the bending portion 125 of the first substrate extension portion 120.

The second electrode 232 of the first sensor layer 204 may be disposed on the first substrate extension portion 120. A second voltage may be applied to the second electrode 232 of the first sensor layer 204. Here, the first voltage is changed to the second voltage by at least the portion of the elastic layer 210 having the changed shape.

In one example embodiment, the second electrode 232 of the first sensor layer 204 may be disposed on the extension portion 122 of the first substrate extension portion 120 and another portion of the bending portion 125.

Accordingly, a capacitance and a resistance between the first electrode 222 and the second electrode 232, the capacitance and the resistance changed by the movement, may be calculated by measuring the second voltage, thereby detecting the movement. Specifically, the first electrode 222 may be further disposed under one portion of the bending portion 125 of the first substrate extension portion 120, and the second electrode 232 may be further disposed on another portion of the bending portion 125 of the first substrate extension portion 120, thereby improving the sensitivity of the first sensor layer 204.

The first electrodes of the second through fourth sensor layers 304, 404, 504 may be further disposed under one portion of the bending portions 145, 165, 185, respectively. The second electrodes of the second through fourth sensor layers 304, 404, 504 may be further disposed on another portion of the bending portions 145, 165, 185, respectively.

As shown in FIGS. 12 and 13, when the pressure is input to the display layer 150, e.g., by a user's finger, at least a portion of the elastic layer 210 disposed in the first region A of the first sensor layer 204 may be inserted in the second region B of the first sensor layer 204. Accordingly, the capacitance and insulation resistance of the first and second electrode 222, 232 may be changed. Therefore, the movement input can be detected by measuring the capacitance and insulation resistance.

Specifically, deformation of the elastic layer 210 generated by the movement may occur more significantly due to the first and second side walls 240, 250. At least the portion of the elastic layer 210 may be inserted adjacent to the bending portion 125 of the first substrate extension portion 120.

The first electrode 222 may be further disposed under one portion of the bending portion 125, and the second electrode 232 may be further disposed under another portion of the bending portion 125. Therefore, changes in the capacitance and insulation resistance between the first and second electrode 222, 232 generated by inserting at least the portion of the elastic layer 210 may occur more significantly. In result, the sensitivity of the first sensor layer 204 may increase.

Likewise, the sensitivities of the second through fourth sensor layers 304, 404, 504 may increase.

Figure 14:
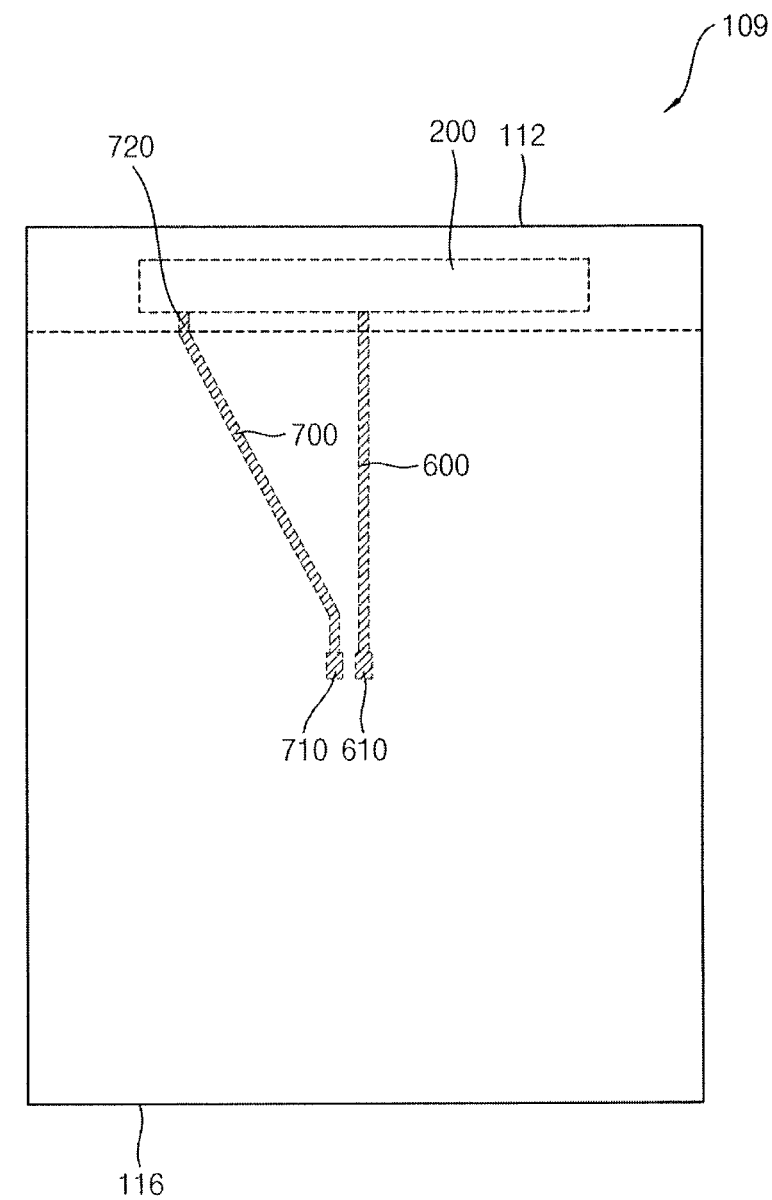
FIG. 14 illustrates a plan view of a flexible display device according to example embodiments.
Figure 15:
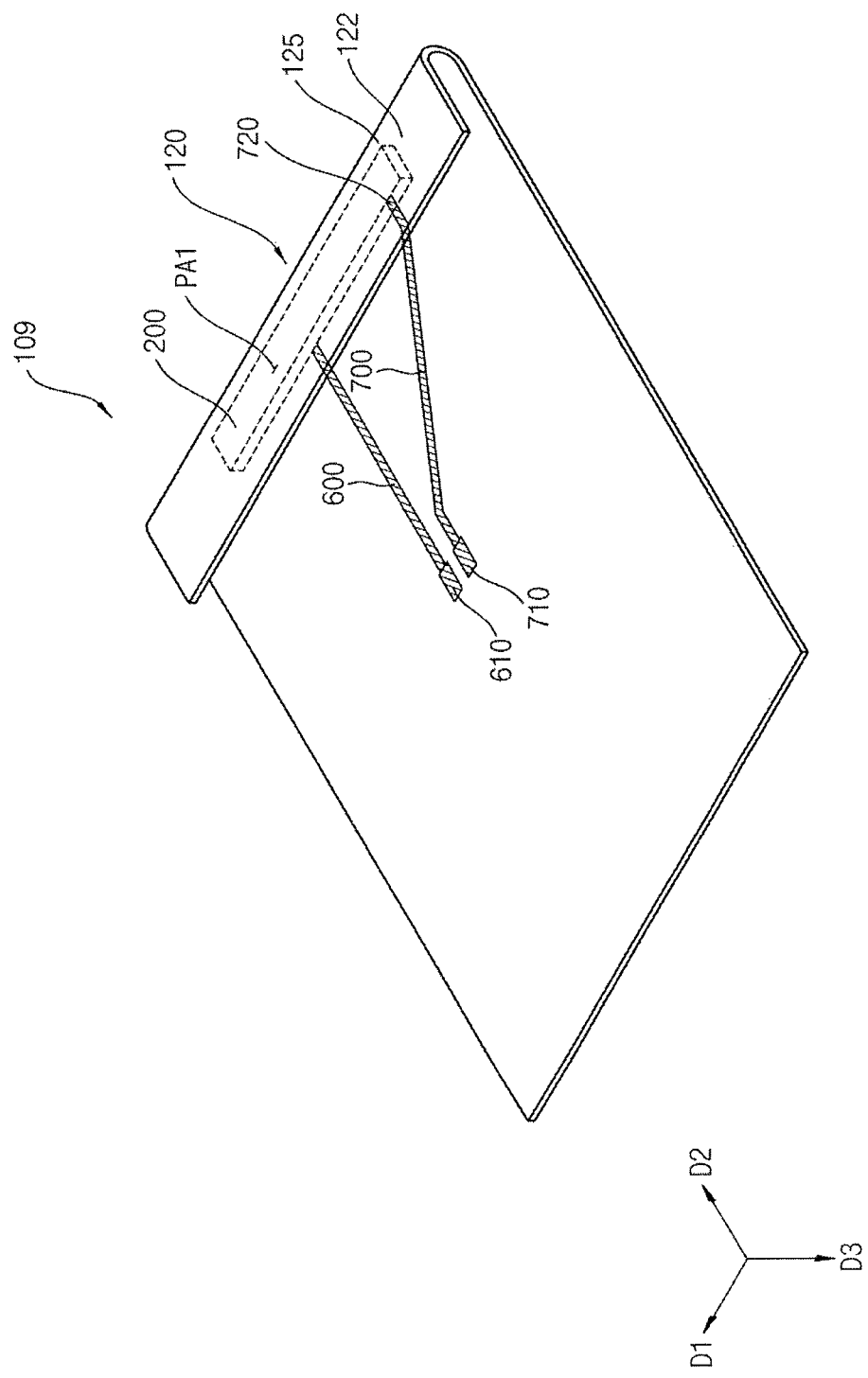
FIG. 15 illustrates a perspective view of a flexible display device of FIG. 15.

FIG. 14 is a plan view illustrating a flexible display device 109 according to example embodiments. FIG. 15 is a perspective view illustrating a flexible display device of FIG. 15.

The display device according to the present exemplary embodiment is substantially the same as the display device of the exemplary embodiment described in FIGS. 1 through 7, except that the second through fourth substrate extension portions and the second through fourth sensor layers are excluded. Therefore, the same reference numerals will be used to refer to the same or like parts as those described in the previous exemplary embodiment of FIGS. 1 through 7, and any repetitive explanation concerning the above elements will be omitted.

Referring to FIGS. 14 and 15, the flexible display device 109 may include the flexible substrate body 110, the display layer 150, the first substrate extension portion 120, and the first sensor layer 200.

The first substrate extension portion 120 may be bent from the first side 112 of the flexible substrate body 110 and may extend along the second surface 104 of the flexible substrate body 110, e.g., along the second direction D2. The first substrate extension portion 120 may overlap the flexible substrate body 110 when bent.

For example, the first substrate extension portion 120 may include a bending portion 125 bent from the first side 112 of the flexible substrate body 110 and an extension portion 122 connected to the bending portion 125 and extending along the second side 104 of the flexible substrate body 110.

The first sensor layer 200 may be interposed between the flexible substrate body 110 and the first substrate extension portion 120 to detect a movement input to the display layer 150. The first sensor layer 200 may include an elastic layer 210 and first and second electrodes 220, 230. The elastic layer 210 may have an original shape or a changed shape. Here, the original shape is converted into the changed shape in response to the movement input, and the original shape is recovered by an elastic force when the movement input ceases. The first and second electrodes 220, 230 may be disposed adjacent to the elastic layer 210. At least a portion of the elastic layer 210 having the changed shape may be inserted between the first and second electrodes 220, 230 spaced apart from each other.

For example, the first sensor layer 200 may be divided into the first and second regions A, B. The elastic layer 210 may be disposed in the first region A. The first and second electrodes 220, 230 may be disposed in the second region B. Also, at least the portion of the elastic layer 210 disposed in the first region A may be inserted into between the first electrode 220 and the second electrode 230 disposed in the second region B by the movement.

In one example embodiment, the flexible display device 109 may further include a first voltage wire 600 disposed under the second surface 104 of the flexible substrate body 110 and electrically connected to the first electrode 220 of the first sensor layer 200 to apply the first voltage to the first electrode 220. As shown in FIG. 5, the first voltage wire 600 may receive the first voltage via a first voltage pad 610 and may apply the first voltage to the first electrode 220 of the first sensor layer 200.

The flexible display device 109 may further include a second voltage wire 700 disposed under the second surface 104 of the flexible substrate body 110 and electrically connected to the second electrode 230 of the first through fourth sensor layer 200. As shown in FIG. 6, the second voltage applied to the second electrode 230 of the first sensor layer 200 may be applied to the second voltage pad 710 through a second voltage auxiliary pad 720, a first connection member 730, and a second voltage wire 700.

Accordingly, a capacitance and a resistance between the first and second electrodes 220, 230 of the first sensor layer 200 may be calculated by measuring the second voltages changed by the movement, thereby detecting the movement.

In the display device 109 according to example embodiments, the first sensor layer 200 may be disposed in a space between the flexible substrate body 110 and the first substrate extension portion 120 bent from and extending along the flexible substrate body 110. Accordingly, the display device may be implemented as a simple structure with a decreased thickness.

By way of summation and review, one or more embodiments provide a flexible display device capable of decreasing a thickness and/or improving a sensitivity of a sensor. In particular, one or more embodiments may include a flexible display device having a sensor layer between a flexible substrate body and a substrate extension portion that is bent from a side of the flexible substrate body and extends along the flexible substrate body. Accordingly, the display device may be implemented as a simple structure to decrease a thickness. Additionally or alternatively, one or more embodiments may include a flexible display device that has a sensor layer including an elastic layer in a first region and first and second electrodes disposed in a second region. At least a portion of the elastic layer may protrude into between the first and second electrodes in response to a movement input. Accordingly, the sensor layer of the display device may have improved sensitivity by measuring a capacitance and a resistance between the first electrode and second electrode.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible display device, comprising:
   a flexible substrate body including a first surface and a second surface opposite to the first surface;
   a display layer on the first surface of the flexible substrate body;
   a substrate extension portion bent from a side of the flexible substrate body, the substrate extension portion extending along the second surface of the flexible substrate body and overlapping the flexible substrate body; and
   a sensor layer between the flexible substrate body and the substrate extension portion to detect a movement input to the display layer,
   wherein the sensor layer includes:
   an elastic layer having an original shape or a changed shape, wherein the original shape is converted into the changed shape in response to a movement input and the original shape is recovered by an elastic force when the movement input ceases; and
   first and second electrodes adjacent to the elastic layer, wherein at least a portion of the elastic layer having the changed shape extends between the first and second electrodes spaced apart from each other in response to the movement input.

2. The flexible display device as claimed in claim 1, wherein:
   the first electrode is under the second surface of the flexible substrate body and receives a first voltage for detecting the movement input to the display layer,
   the second electrode is on the substrate extension portion and receives a second voltage, and
   the first voltage is converted into the second voltage by the portion of the elastic layer having the changed shape.

3. The flexible display device as claimed in claim 2, wherein the first voltage is a square wave.

4. The flexible display device as claimed in claim 2, further comprising:
   a first voltage wire under the second surface of the flexible substrate body and electrically connected to the first electrode to apply the first voltage to the first electrode; and
   a second voltage wire under the second surface of the flexible substrate body and electrically connected to the second electrode disposed on the substrate extension portion through a connection member.

5. The flexible display device as claimed in claim 4, wherein the connection member includes a silver paste.

6. The flexible display device as claimed in claim 1, wherein:
   the first electrode is in contact with the second surface of the flexible substrate body, and
   the second electrode is in contact with the substrate extension portion.

7. The flexible display device as claimed in claim 1, wherein the first and second electrodes are adjacent to the side of the flexible substrate body.

8. The flexible display device as claimed in claim 1, wherein the first and second electrodes extend along the side of the flexible substrate body.

9. The flexible display device as claimed in claim 1, wherein the substrate extension portion includes:
   a bending portion bent from the side of the flexible substrate body; and
   an extension portion connected to the bending portion and extending along the second side of the flexible substrate body,
   wherein the first electrode is under the second surface of the flexible substrate body and one portion of the bending portion, and
   wherein the second electrode is on the extension portion and another portion of the bending portion.

10. The flexible display device as claimed in claim 1, wherein the elastic layer includes a resin having nickel.

11. The flexible display device as claimed in claim 1, wherein the elastic layer is contact with the flexible substrate body and the substrate extension portion.

12. The flexible display device as claimed in claim 1, wherein the elastic layer extends along the side of the flexible substrate body.

13. The flexible display device as claimed in claim 1, wherein the sensor layer further includes:
   a first side wall between the elastic layer and the first and second electrodes, and in contact with a first side of the elastic layer; and
   a second side wall in contact with a second side of the elastic layer opposite to the first side of the elastic layer, and
   wherein the first side wall includes a hole through which the portion of the elastic layer having the changed shape passes.

14. The flexible display device as claimed in claim 13, wherein the first and second side walls include a plastic material.

15. The flexible display device as claimed in claim 1, wherein:
   the sensor layer is divided into first and second regions,
   the elastic layer is disposed in the first region,
   the first and second electrodes are disposed in the second region, and
   the portion of the elastic layer having the changed shape disposed in the first region protrudes into a space between the first and second electrodes in the second region in response to the movement input.

16. The flexible display device as claimed in claim 1, wherein:
   the side of the flexible substrate body includes first and third sides opposite to each other, and second and fourth sides that connect the first side to the third side and are opposite to each other,
   the substrate extension portion includes first through fourth substrate extension portions that are respectively bent from the first through fourth sides and extend along the second side of the flexible substrate body, and
   the sensor layer includes first through fourth sensor layers that are between the flexible substrate body and the first through fourth substrate extension portions, respectively.

17. The flexible display device as claimed in claim 16, wherein each of the first through fourth sensor layers includes:
   an elastic layer having an original shape or a changed shape, wherein the original shape is converted into the changed shape by the movement input and the original shape is recovered by an elastic force when the movement input ceases; and
   first and second electrodes adjacent to the elastic layer, and
   wherein at least a portion of the elastic layer having the changed shape protrudes between the first and second electrodes.

18. The flexible display device as claimed in claim 17, further comprising:
   a first voltage wire under the second surface of the flexible substrate body and electrically connected to the first electrode of the first sensor layer;
   first voltage auxiliary wires under the second surface of the flexible substrate body and electrically connecting the first electrodes of the first through fourth sensor layers to each other; and
   second voltage wires under the second surface of the flexible substrate body and electrically connected to the second electrodes disposed on the first through fourth substrate extension portions through first through fourth connection members, respectively.

19. A flexible display device, comprising:
   a flexible substrate body including a first surface and a second surface opposite to the first surface;
   a display layer on the first surface of the flexible substrate body;
   a substrate extension portion to be bent from a side of the flexible substrate body; and
   a sensor layer having a first portion on the first surface of the flexible substrate body, a second portion on the second surface of the flexible substrate body, and a third portion on the substrate extension portion, the sensor layer to detect a movement input to the display layer,
   wherein, when bent, the substrate extension portion including the third portion of the sensor layer extends along the second surface of the flexible substrate body and overlaps the first and second portions of the sensor layer, and
   wherein the sensor layer includes:
      an elastic layer having an original shape or a changed shape, wherein the original shape is converted into the changed shape in response to a movement input and the original shape is recovered by an elastic force when the movement input ceases; and
      first and second electrodes adjacent to the elastic layer, wherein at least a portion of the elastic layer having the changed shape extends between the first and second electrodes spaced apart from each other in response to the movement input.

* * * * *